(12) United States Patent
Jensen

(10) Patent No.: US 6,708,803 B2
(45) Date of Patent: Mar. 23, 2004

(54) SELF-LEVELING DUAL SPRING RATE STRUT

(76) Inventor: Mark Andrew Jensen, 259 Barrington Farms Pkwy., Sharpsburg, GA (US) 30277

( * ) Notice: Subject to any disclaimer, the term of this patent is extended or adjusted under 35 U.S.C. 154(b) by 0 days.

(21) Appl. No.: 10/165,360

(22) Filed: Jun. 10, 2002

(65) Prior Publication Data

US 2003/0227113 A1 Dec. 11, 2003

(51) Int. Cl.[7] .............................................. F16F 9/18
(52) U.S. Cl. ..................................... 188/275; 188/371
(58) Field of Search ........................... 267/64.11–64.28; 188/275

(56) References Cited

U.S. PATENT DOCUMENTS

| | | | | |
|---|---|---|---|---|
| 3,507,366 A | * | 4/1970 | King | 188/275 |
| 4,062,428 A | * | 12/1977 | Di Rosa | 188/275 |
| 5,538,117 A | * | 7/1996 | Bouchez | 188/371 |
| 6,267,400 B1 | * | 7/2001 | McAndrews | 280/285 |

* cited by examiner

Primary Examiner—Matthew C. Graham

(57) ABSTRACT

An integral self-leveling gas shock strut with dual spring rates as a structural load support between a vehicle chassis and wheel. When the vehicle is driving at an inclined longitudinal pitch a gravity sensitive device within the strut governs a pilot valve which opens to allow a pressure input signal from strut piston compression deflection to close a high flow volume slave valve located between primary and secondary volumetric chambers, trapping gases within the primary chamber to provide a hard spring rate for the strut mounted on the vehicle's downhill side. Contrarily, a similar valve sequence in a companion strut mounted on the vehicle's uphill side opens gas flow communication to combine its primary and secondary chamber volumes, thus providing a soft spring rate and consequent leveling effect of the vehicle using only the pumping action of the strut pistons as a power source, requiring neither external power nor inputs.

5 Claims, 7 Drawing Sheets

V1 = Uncompressed cylinder volume
V2 = Compressed cylinder volume
P1 = Pressure (psi) strut extended
P2 = Pressure (psi) strut compressed $$\frac{V_2}{V_1} = \left(\frac{P_1}{P_2}\right)^{0.71}$$

SELF-LEVELING DUAL SPRING RATE STRUT

REFERENCES CITED

| | | | |
|---|---|---|---|
| 706798 | September 1977 | Sanders | 267/64.25 |
| 166416 | May 1995 | Easter | 267/64.24 |
| 696475 | October 2000 | Stuart | 267/64.27 |
| 407319 | September 1999 | Raad, Villec | 280/6.157 |
| 216644 | December 1998 | Wilms,et al. | 267/136 |
| 061695 | April 1998 | Gatehouse, et al. | 267/64.11 |
| 614807 | November 1990 | Majeed | 280/5.515 |
| 794759 | November 1985 | Handke, et al. | 267/221 |
| 084681 | August 1987 | Cummins | 280/124.159 |
| 6389341 | January 2001 | Davis | 701/37 |
| 770125 | January 2001 | Oliver, et al. | 188/318 |
| 406324 | September 1999 | Vig | 280/6.159 |

FEDERALLY SPONSORED RESEARCH OR DEVELOPMENT

Not Applicable

REFERENCE TO SEQUENCE LISTING, A TABLE, OR A COMPUTER LISTING COMPACT DISK APPENDIX

Not Applicable

BACKGROUND OF THE INVENTION

Air springs have many applications within vehicle suspension systems and are often referred to as struts, or suspension members utilizing pressurized air or gas as a compressible elastic medium between a structurally spaced load and support, which also may utilize oil as a dampening medium. By this definition the present invention is herein referred to as a gas strut. Gas struts are commonly used in off-road applications as either complimentary support mounted in addition to other vehicle supports, such as coil, leaf or torsion springs, or as the sole means of vehicle support.

The application of using a gas strut as the sole means of vehicle support is problematic in that air and gas provide very low spring rates from full strut extension throughout much of the first portion of the strut's compression stroke, causing the vehicle to lean significantly when driven on the side of a hill, and also during hard turns. Vehicle roll-overs are possible in these conditions when in the extreme. One of the more popular embodiments of an off-road gas strut is the long-travel gas strut. Unfortunately, the longer the travel, or stroke, the more pronounced the aforementioned problem becomes. Some off-road enthusiasts and off-road racers have resolved this problem by either installing additional struts, or springs, or by increasing the gas pressure within the strut. These solutions, however, result in a harsh and unpleasant ride as added springs or strut gas pressures may exceed the ideal spring pressure to vehicle weight ratio, and excessively high strut gas pressures can cause the strut piston to effectively hydraulic lock prior to achieving a complete compression stroke. Thus, a dual mode spring rate which can automatically change with respect to driving conditions would be an ideal improvement.

The following are references to prior art suspension systems that should provide a basis for general comparison to the present invention. Other patent references are listed for review in the references cited section but not explained herein.

Pat. Appl. No. 706798 is a velocity sensitive dual rate shock strut using fluid as a damping medium and gas trapped in a primary chamber above the fluid as a spring is modified by adding a secondary chamber with an orificed inlet to the primary chamber above the normal fluid level. On extreme deflections, the fluid level within the strut reaches the orifice which severely restricts flow therethrough to cause a second greatly increased spring rate for the gaseous spring which also is velocity sensitive.

Pat. Appl. No. 166416 is an adjustable rate air spring having a flexible membrane with a spring rate adjustable by adding or removing fluid or air through an external connection.

Pat. Appl. No. 696475 is a dual volume air spring for suspensions in which a post like closer closes a communication port between primary and secondary chambers when the primary chamber air bag is sufficiently compressed.

Pat. Appl. No. 407319 is an automatic suspension leveling system employing automatic gas levelers at each wheel, a reservoir, electrically operated valves, electric height position sensors and a compressor.

Pat. Appl. No. 216644 is a self-pumping hydropneumatic shock strut which levels the vehicle via a pumping action which activates oil transfer from a low pressure area to a high pressure area thus reducing the effective compressible area of the spring, or high pressure area. Said invention is therefore similar in function to other inventions which automatically alter spring rate by changing fluid volume within the strut.

These and other prior art suspension systems either (1) operate in a soft spring rate for the initial strut deflection distance and then provide either a second, harder spring rate or more restrictive dampening only after a lengthy compression or deflection, and/or (2) the spring rate is adjustable by adding or removing gas or fluid. In some prior art suspension systems this addition or removal of gas or fluid is accomplished automatically by load leveling sensors which actuate remote pumps in communication with gas reservoirs to vary pressures to the struts with the higher loads, or to the struts detected to require additional support to level the vehicle.

These devices, however, do not respond quickly enough to be as beneficial in high speed off-road sport or racing applications as is the present invention. To minimize the effect of vehicle roll a quick strut response to vehicle inclination and centrifugal force is crucial. Struts which require extreme suspension deflection before providing a multiplied spring rate inherently allow excessive vehicle sag, or roll, before compensation begins to take effect, and increased dampening by itself will not help to support the load side of the vehicle, but only delay vehicle leaning effect.

SUMMARY

One object of the present invention is to improve on prior art suspension systems with an integral twin gas chamber shock strut, independent of external power sources and inputs, capable of immediately sensing and quickly reacting to vehicle inclination and centrifugal forces, and automatically change spring rate to either hard or soft as needed to provide a quick response leveling effect of the vehicle on uneven terrain and a comfortable ride on level terrain.

Another object is to provide an inclination and centrifugal force-sensitive dual spring rate strut that is more stable when embodied as a long travel strut, with piston strokes greater than 6", where current long travel strut offerings either only slow suspension deflection by increasing gas or fluid dampening restriction, or increase spring rate with velocity sensitive valves which close or restrict communication to a secondary chamber after a significant suspension deflection.

In the present invention, valve ports close immediately in response to vehicle inclination or centrifugal force to confine strut gases within the primary chamber to provide a hard spring rate on the high load side of the vehicle. When communication ports between the primary and secondary chambers are open, the strut piston, while traveling the same linear distance as before, is now compressing its gases within a much larger combined volumetric area, thus providing a soft spring rate.

Vehicle inclination is detected by a gravity-sensitive rotating weight mechanically coupled to open or close a pilot valve which directs pressure differentials, created by strut piston pumping action within the primary chamber, to pressurize one side of a sliding high gas volume spool valve, which moves within its own cylinder, changing said spool's port positions to either open or close gas flow communication between the primary and secondary chambers.

Said spool, being approximately ½ the surface area of the strut piston, requires only a minute portion of the volumetric high pressure displaced by an approximate 0.07" strut piston compression stroke linear deflection to achieve full stroke port position change, thereby achieving a quick response to pilot valve pressure input signals. Overall, spring rate change is virtually immediate with this valve sequence.

BRIEF DESCRIPTION OF THE DRAWINGS

FIG. 4A is the left end view of FIG. 4 showing the counter clockwise rotation of the weighted lobe used to detect vehicle inclination.

FIG. 4B is the right end view of FIG. 4 showing the pilot valve blocking the lower portion of seat 20.

FIG. 5A is the left end view of FIG. 5 showing the clockwise rotation of the weighted lobe used to detect vehicle inclination.

FIG. 5B is the right end view of FIG. 5 showing the pilot valve blocking the upper portion of seat 20.

DETAILED DESCRIPTION OF THE INVENTION

Figure 1:
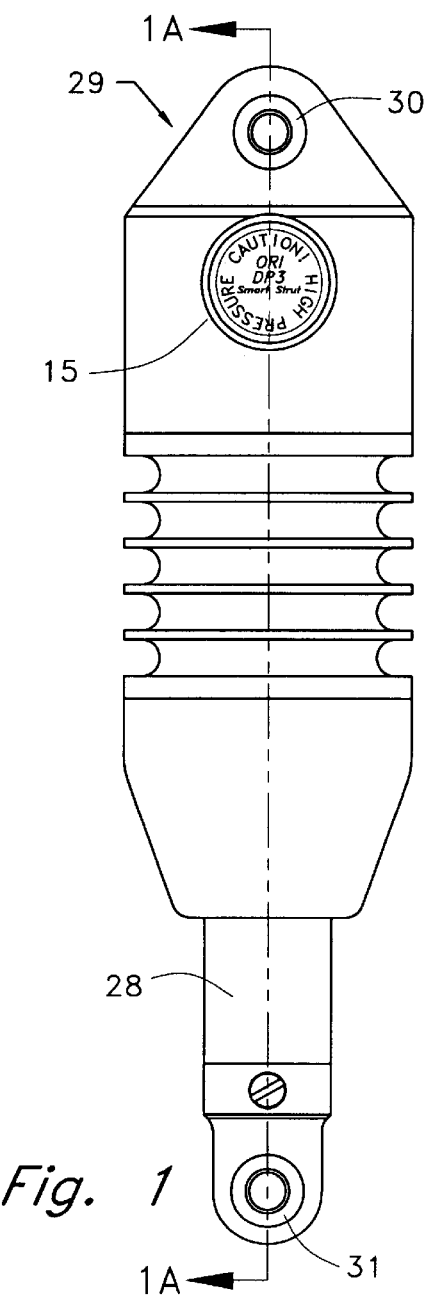
FIG. 1 is a full pictorial elevation view of the strut assembly with no cross sections.
Figure 1A:
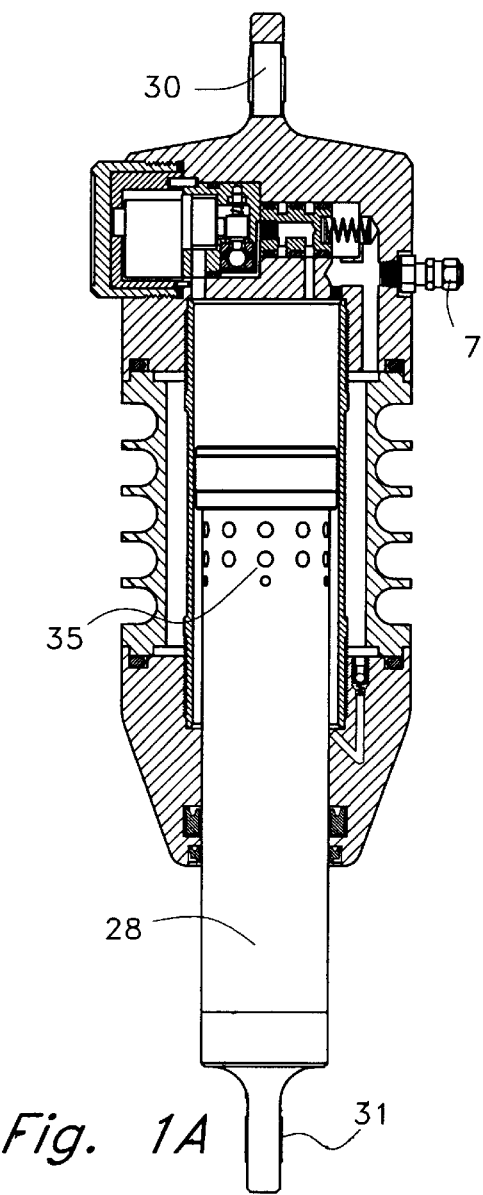
FIG. 1A is a full sectional view 90 degrees rotated about the longitudinal axis of the strut shown in FIG. 1
Figure 2:
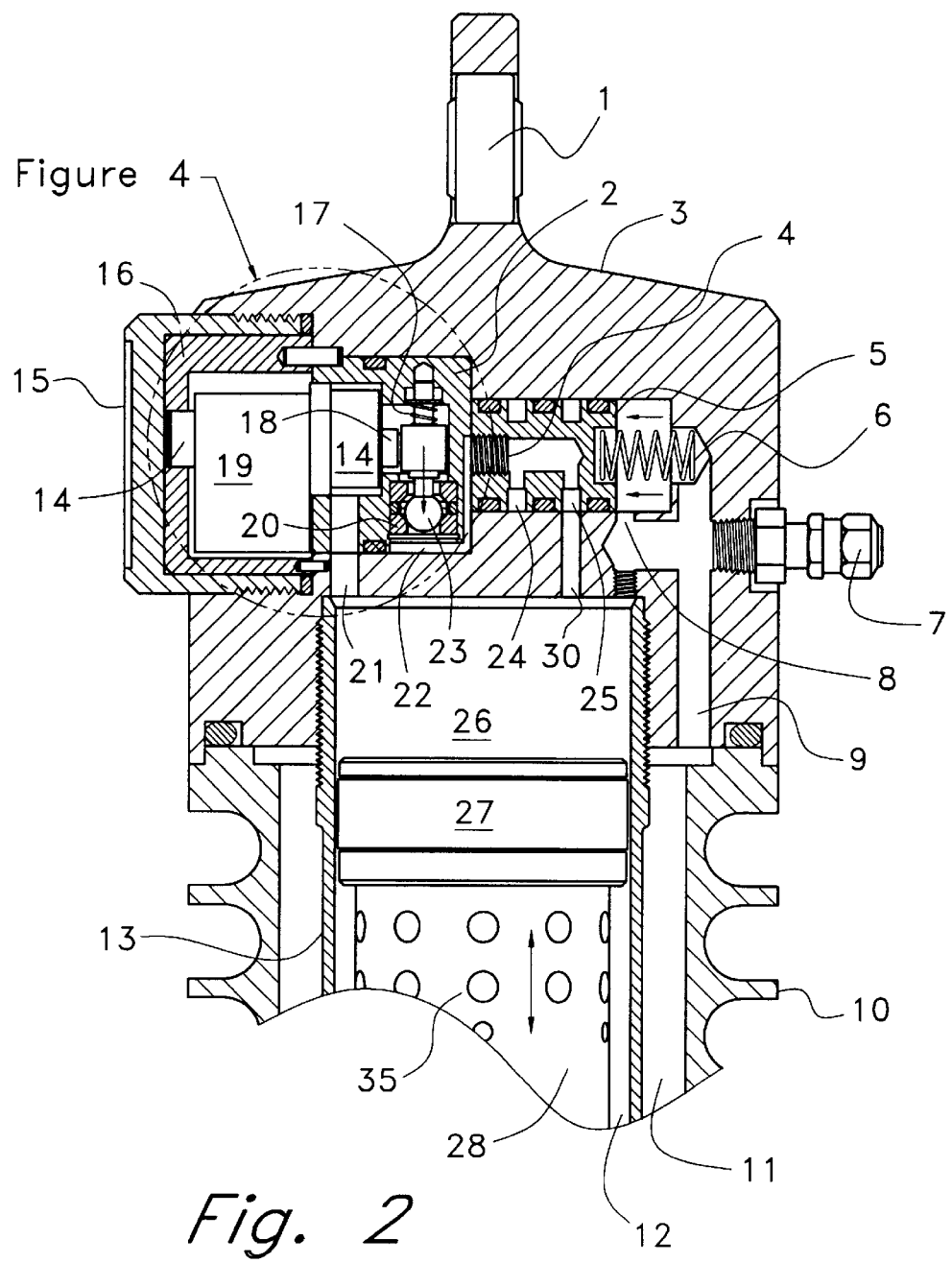
FIG. 2 is a further enlargement of the sectional view of the upper cap assembly shown in FIG. 1A, showing strut valving switched to the hard spring rate mode.
Figure 3:
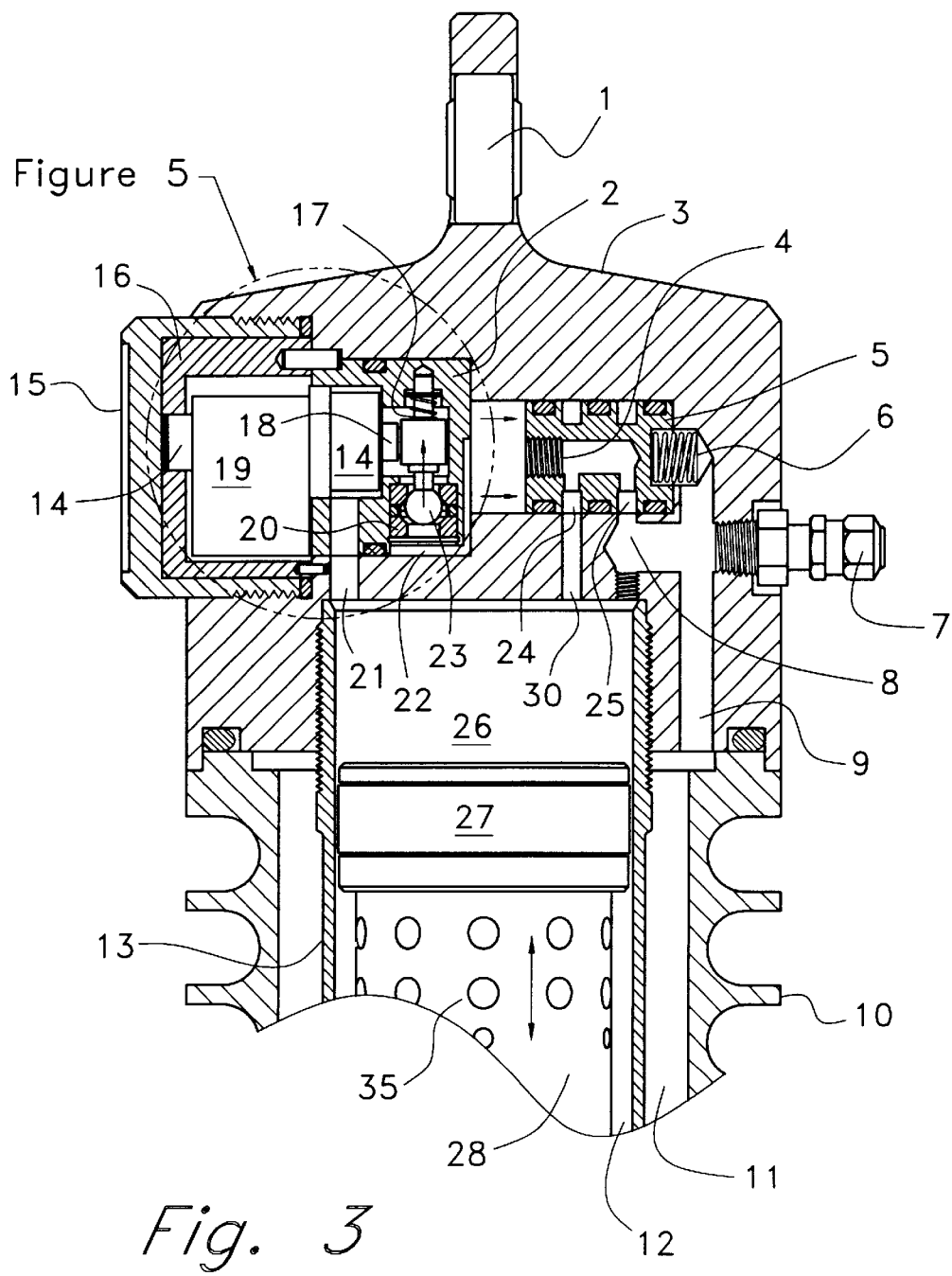
FIG. 3 is a further enlargement of the sectional view of the upper cap assembly shown in FIG. 1A, however, showing strut valving switched to the soft spring rate mode.
Figure 4:
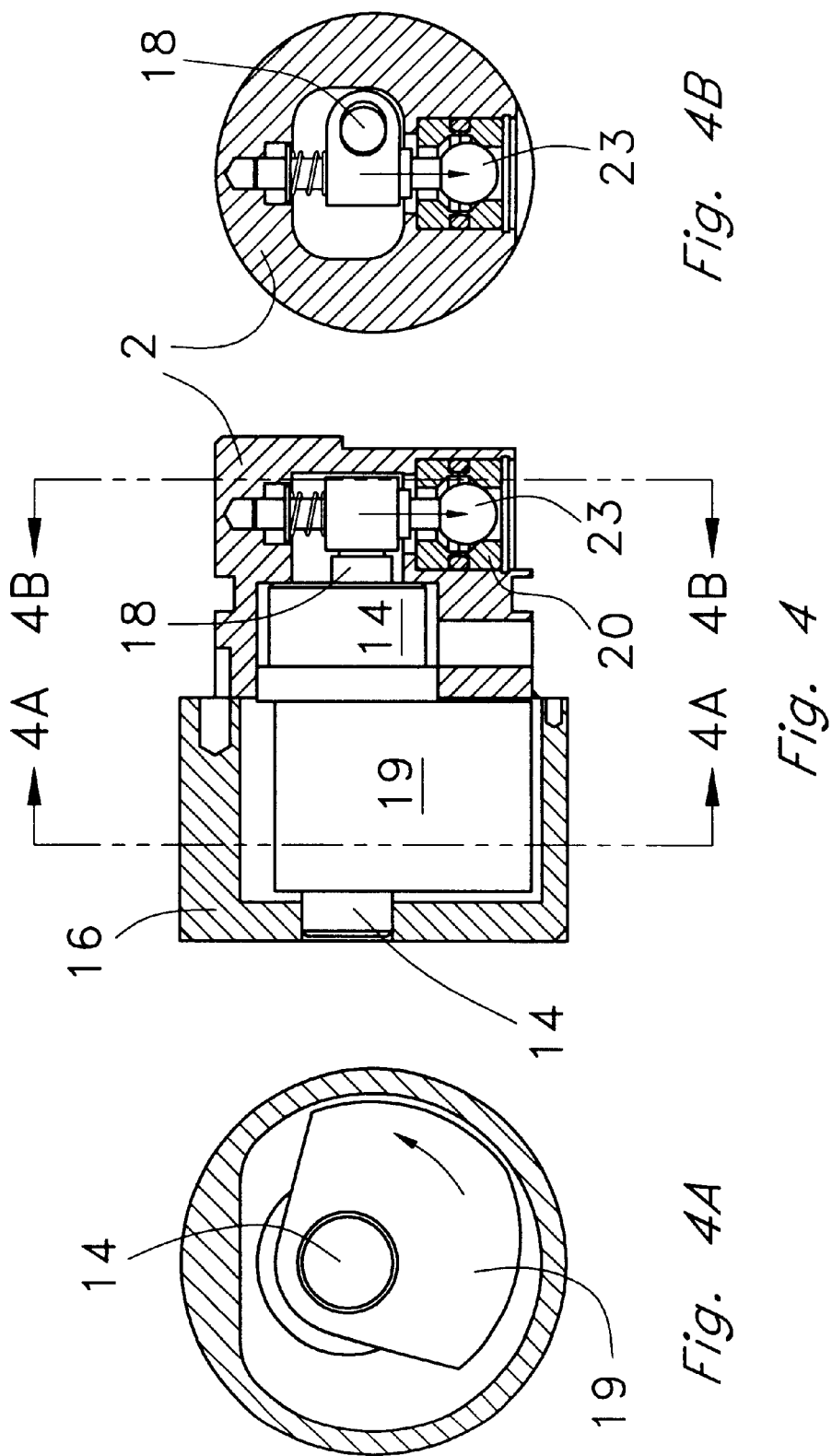
FIG. 4 is a partial, sectional view taken from FIG. 2 to show enlarged detail of the strut when switched to the hard spring rate mode.
Figure 5:
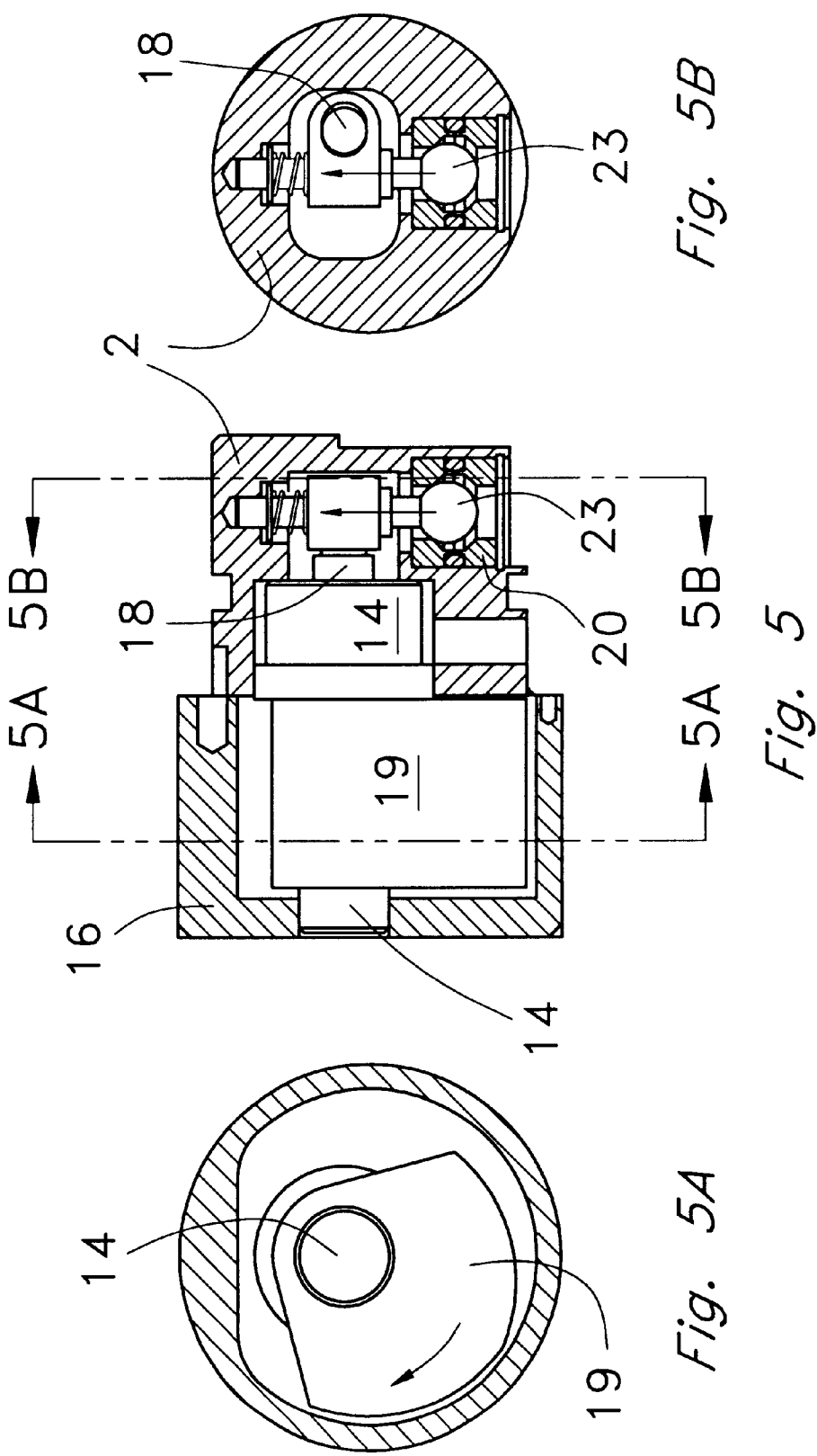
FIG. 5 is a partial, sectional view taken from FIG. 3 to show enlarged detail of the strut when switched to the soft spring rate mode.
Figure 6:
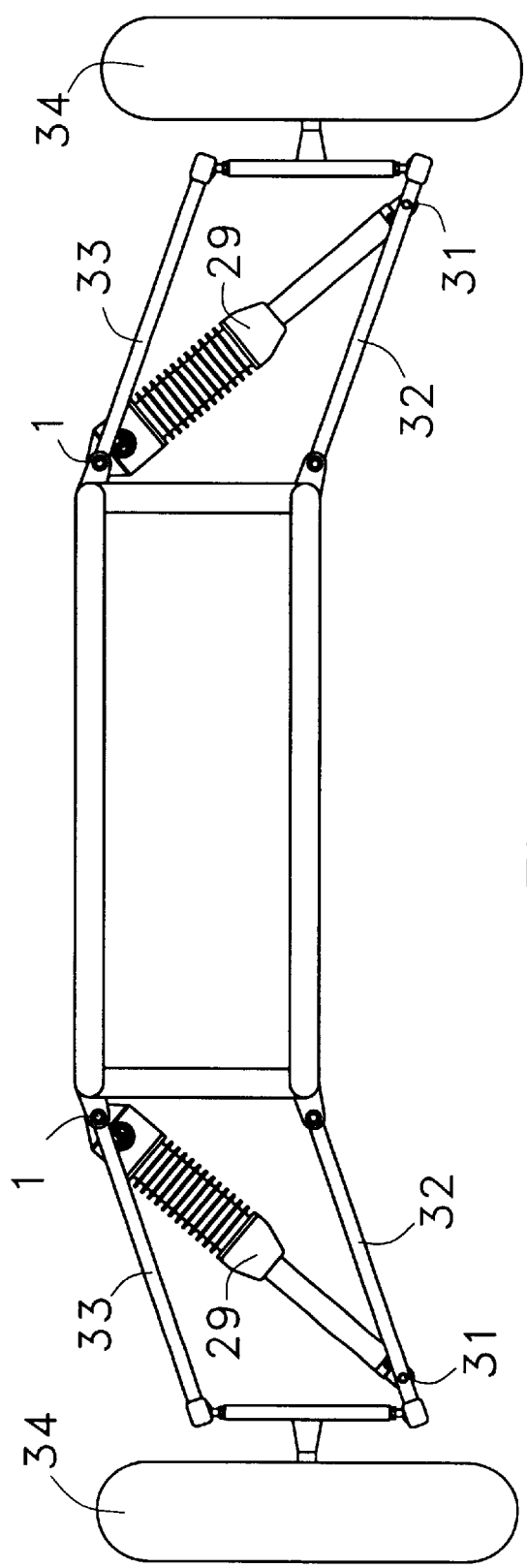
FIG. 6 is a generic elevational view of two struts mounted on the right and left sides of a vehicle frame, showing one possible option for mounting position and angle.

The preferred embodiment 29 of the present invention is depicted generally in FIGS. 1 through 7. Strut 29 is a load carrying and pressure containing suspension member, and as such is constructed primarily of rigid metallic parts with the exception of resilient elastomeric O-rings and seals used for sealing internal pressure and dampening oil containment. Strut 29 is mountable at either end between the vehicle chassis and wheel assembly, FIGS. 1, 1A, and 6, at upper mount 1 and lower mount 31, with lower mount 31 threadingly attached to piston shaft 28. Piston shaft 28 with threadingly affixed piston 27 is a sub assembly which oscillates through a dampening oil medium within rigid primary cylinder 13 for the purpose of absorbing vibrations transmitted through wheel 34 and control arms 32 and 33 from road surface depressions and protrusions. Dampening oil in primary chamber 26 is transmitted both past piston 27 and through holes 35 in piston shaft 28, FIGS. 2 and 3, into volumetric area 12. A manually variable initial static pressure is input into strut 29 via high pressure tank valve 7 after assembly is complete and mechanically sealed at all possible leak paths. Cover 15 threadingly and sealingly attached to upper cap 3 retains pressure and internal sub assemblies shown in part in FIGS. 4 and 5. Rigid outer cylinder 10 retains pressure 11 within the secondary chamber.

The vehicle inclination sensing mechanism is influenced by gravity acting upon weighted lobe 19 which is supported in bearing journals machined into bearing cap 16 and cartridge 2, which as lobe 19 will tend to rotate and suspend with its heaviest side downward, will act upon rigidly attached cam 14, rotating it either clockwise or counter clockwise as the vehicle leans, or rolls, left to right about its longitudinal axis. Hardened steel cam pin 18 is eccentrically fitted into the end of cam 14 at a static position perpendicular and at 90 degrees to the vertical axis of strut 29, thus affecting a lifting and lowering motion upon pilot valve 23 which is hinged to said cam pin 18. Pilot valve 23 will seal against either the upper or lower sealing surfaces of seat 20 depending upon its movement dictated by cam rotation.

In the default hard spring rate mode of operation cam 14 rotation is counter clockwise, FIG. 4A, and cam pin 18 is pushing downward upon pilot valve 23, FIG. 4B, sealing it against the lower portion of seat 20. In the extended, downward, position of piston 27 gas pressure 26 within the primary chamber and gas pressure 11 within the secondary chamber are approximately equal. In this equal state force from steel compression spring 6, coaxially aligned at one end of spool 5, FIG. 2, will bias spool 5 to the closed default position thereby changing spool port positions 24 and 25 to the closed position and blocking high flow gas communication between the primary and secondary chambers by directing primary chamber gas pressure 26 through upper cap port 30 into spool port 25 and ultimately blocked at spool port 24 and spool sealingly threaded plug 4. With pressures between the primary and secondary chambers still approximately equal, the combined forces from spring 6 and high gas pressure now trapped in pilot chamber 22 will unseat pilot valve 23, pushing against the weight force of lobe 19, and allow this high gas pressure to vent into the lower pressure potential of primary chamber volume 26. As long as the vehicle is inclined in such a way as to maintain lobe 19 and cam 14 rotational downward pressure against pilot valve 23, spool 5 will remain in the closed position, and subsequent upward compression and downward rebound strokes of piston 27 will compress only the gas 26 now trapped within the primary chamber. An upward stroke of piston 27 will induce a high pressure between piston 27 and the top side of pilot valve 23 ensuring that spool 5 remains in the closed position.

In the soft spring rate mode of operation for either level driving or for the strut on the vehicle's uphill side lobe 19 and cam 14 rotation are clockwise, FIG. 5A, and cam pin 18 is pulling upward on pilot valve 23, FIG. 5B, sealing it against the upper portion of seat 20. In the extended, downward, position of piston 27 gas pressure 26 within the primary chamber and gas pressure 11 within the secondary chamber are approximately equal. In this equal state force from spring 6, FIG. 3, will attempt to push spool 5 to the closed position. If spool 5 is already in the closed position, FIG. 2, no movement will occur. If spool 5 is in the open position, FIG. 3, gas pressure trapped in pilot chamber 22 between the spool end opposite spring 6 and pilot valve 23 will prevent spool 5 from moving significantly. An approximate 0.07" upward stroke movement of piston 27 will now force primary chamber high pressure 27 through upper cap port 21 and unseat pilot valve 23 against the weaker force of steel compression spring 17 thus allowing pilot chamber 22 to pressurize and force spool 5 to the open position against the now relatively weaker spring force of spring 6 as compared to the higher gas pressure force 26 within the now highly compressed primary chamber. Spool 5 port positions are now aligned so as to allow gas flow communication from primary chamber 26 to pass through upper cap port 30, through spool port 24, pass through said spool and exit through spool port 25, through upper cap ports 8 and 9, and ultimately into secondary chamber volume 11 allowing high flow gas communication between primary and secondary chambers 26 and 11 thereby creating a soft spring rate with the combined volumes of said chambers. As long as the vehicle is inclined in such a way as to maintain lobe 19 and cam 14 rotational upward pressure against pilot valve 23, spool 5 will remain in the open position with high pressure trapped in pilot chamber 22, and subsequent upward compression and downward rebound strokes of piston 27 will compress the combined gas volumes 26 and 11 for a soft spring rate.

Figure 7:
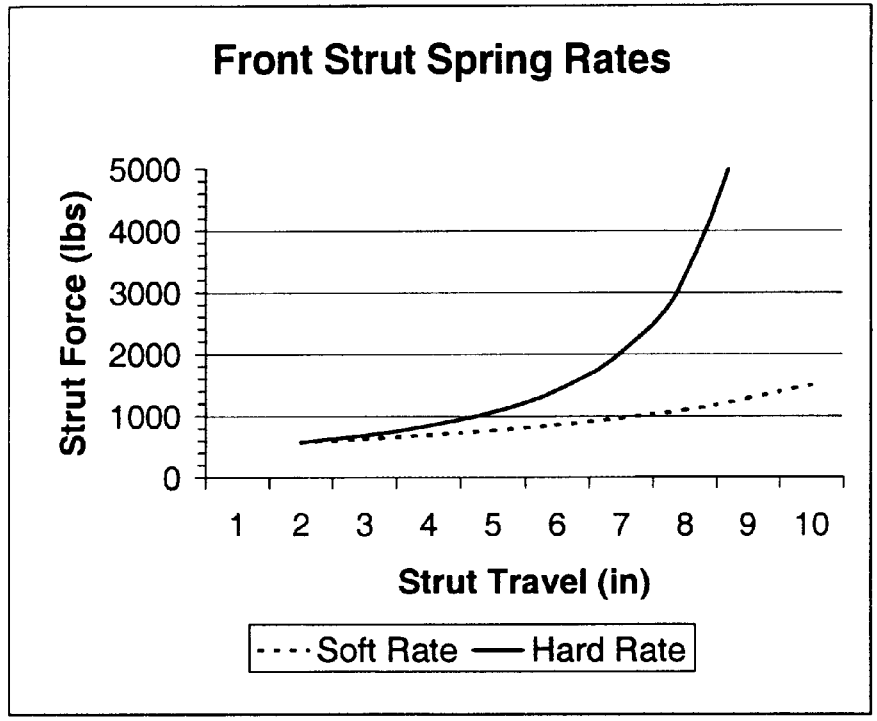
FIG. 7 is a graphical representation depicting the relationship between hard and soft spring rates in one of many possible embodiments of the present invention. The depicted embodiment shows the compared hard and soft spring rates for a 10 inch travel strut mounted at a 30 degree angle with a static gas pressure of 240 psi.

Both hard and soft spring rates for an exemplar single front-mounted strut are graphically compared in FIG. 7 which represents weight supporting strut forces in pounds iterating the volume pressure relationship formula $V_2/V_1 = (P_1/P_2)^{0.71}$ for each of the data points plotted. Other variables considered are gross vehicle weight and vehicle center of gravity relative to vehicle center between front and rear to derive static weight at each strut, strut shaft diameter to derive effective piston area, strut mounting angle, strut travel, and initial gas pressure at full strut extension. The graph vertical axis shows strut vertical lifting force in pounds relative to a level gravitational plane. The horizontal axis shows strut linear compression in inches relative to its longitudinal center line, starting at full extension (0") and ending at full compression (10"). The solid line depicts the default hard spring rate and the broken line depicts the alternate strut mode soft spring rate.

To enable many strut mounting angles, lobe 19 can be locked to cam 14 in many rotational positions, which strut setup calibration sets pilot valve 23 operating position relative to the strut mounting angle of deflection from the strut vertical plane.

The present invention as shown in the preferred embodiment is only one of many possible constructions by which the improvements to the art described herein may be achieved. It is understood that by varying size, shape, materials, mounting, and manufacturing practices improvements can be made to lower manufacturing cost, design simplicity, and application of the invention within the art, and by no means is the present invention restricted to the preferred embodiment. Further details of possible variations to the preferred embodiment are outlined within the appended claims.

I claim:

1. A self-leveling dual spring rate gas shock strut mounted between a structurally separated load and support which has a piston which oscillates within a primary chamber in response to vehicle suspension deflections, said primary chamber either in open gas or fluid flow communication with a secondary chamber for a combined volume soft spring rate or isolated from said secondary chamber for a smaller relative volume hard spring rate;

said opening and closing of gas or fluid communication between chambers is controlled by a slave valve;

said slave valve opens gas or fluid flow communication between said chambers when acted upon by a pilot valve which directs pressure to the slave valve at an end opposite a return spring;

and said slave valve closes gas or fluid flow communication between said chambers when acted upon by said return spring, only when said pilot valve position allows venting of gas or fluid pressure opposing said return spring to a pressure differential;

said pressure differential is created by the pumping action of said piston, and governed by said pilot valve;

and said pilot valve position is governed by the motion of a gravity sensitive device which moves responsively to vehicle inclination.

2. A gas shock strut as stated in claim 1, wherein said pilot valve has sufficient flow capacity to open and close high volume gas or fluid flow communication.

3. A gas shock strut as stated in claim 1, wherein said pilot valve directs pressure differentials within said strut to cause to open or to close gas or fluid communication among multiple volumetric chambers, said valve being one of: a ball valve, needle and seat assembly type valve, radially ported rotary valve, diaphragm valve, and a reed valve.

4. A gas shock strut as stated in claim 3, wherein said pilot valve acts upon a slave valve and said slave valve allows passage of a relatively higher gas or fluid volume as compared to the flow volume passed by said pilot valve.

5. A gas shock strut as stated in claim 4 wherein said slave valve is in the form of a sliding ported spool which moves within a ported cylinder.

* * * * *